US011347468B2

(12) United States Patent
Takagi

(10) Patent No.: US 11,347,468 B2
(45) Date of Patent: May 31, 2022

(54) SOUND VOLUME OPERATION DEVICE

(71) Applicant: AlphaTheta Corporation, Yokohama (JP)

(72) Inventor: Nao Takagi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 0 days.

(21) Appl. No.: 15/734,740

(22) PCT Filed: Jun. 6, 2018

(86) PCT No.: PCT/JP2018/021746
§ 371 (c)(1),
(2) Date: Dec. 3, 2020

(87) PCT Pub. No.: WO2019/234861
PCT Pub. Date: Dec. 12, 2019

(65) Prior Publication Data
US 2021/0224025 A1   Jul. 22, 2021

(51) Int. Cl.
*G06F 3/16* (2006.01)
*G10H 1/00* (2006.01)
(Continued)

(52) U.S. Cl.
CPC .............. *G06F 3/165* (2013.01); *G06F 3/162* (2013.01); *G10H 1/0091* (2013.01); *G10H 1/34* (2013.01); *H04H 60/04* (2013.01)

(58) Field of Classification Search
CPC ......... G06F 3/165; G06F 3/162; H04H 60/04; G10H 1/0091; G10H 1/34
See application file for complete search history.

(56) References Cited

U.S. PATENT DOCUMENTS

2003/0039372 A1*   2/2003   Tsutsumi ............... H04S 1/007
                                                                 381/107
2016/0004499 A1*   1/2016   Kim ....................... G06F 3/167
                                                                 715/716
(Continued)

FOREIGN PATENT DOCUMENTS

JP   05-275945    10/1993
JP   2002-116761   4/2002
(Continued)

OTHER PUBLICATIONS

International Search Report, dated Aug. 14, 2018, 2 pages.
PCT International Preliminary Report on Patentability dated Dec. 8, 2020, 6 pages.

*Primary Examiner* — Fan S Tsang
*Assistant Examiner* — David Siegel
(74) *Attorney, Agent, or Firm* — Rankin, Hill & Clark LLP

(57) ABSTRACT

A sound volume operation device configured to amplify and output an inputted acoustic signal includes: at least one sound volume adjuster configured to adjustably amplify an inputted acoustic signal; an output level detector configured to detect an output sound volume level of the acoustic signal amplified by the at least one sound volume adjuster; and an illuminator provided at or adjacent to the at least one sound volume adjuster and configured to provide a different illumination state according to the output sound volume level detected by the output level detector.

4 Claims, 8 Drawing Sheets

(51) Int. Cl.
*G10H 1/34* (2006.01)
*H04H 60/04* (2008.01)

(56) References Cited

U.S. PATENT DOCUMENTS

| | | | | |
|---|---|---|---|---|
| 2016/0170436 A1* | 6/2016 | Farrar | .................... | H04H 60/04 |
| | | | | 345/184 |
| 2021/0136506 A1* | 5/2021 | Kikuhara | .............. | H03F 1/3264 |

FOREIGN PATENT DOCUMENTS

| | | |
|---|---|---|
| JP | 2003-005750 | 1/2003 |
| JP | 2003-069354 | 3/2003 |
| JP | 2005-198356 | 7/2005 |
| JP | 2006-080635 | 3/2006 |
| JP | 2007-306459 | 11/2007 |
| JP | 2009-260787 | 11/2009 |
| JP | 2012-129977 | 7/2012 |

\* cited by examiner

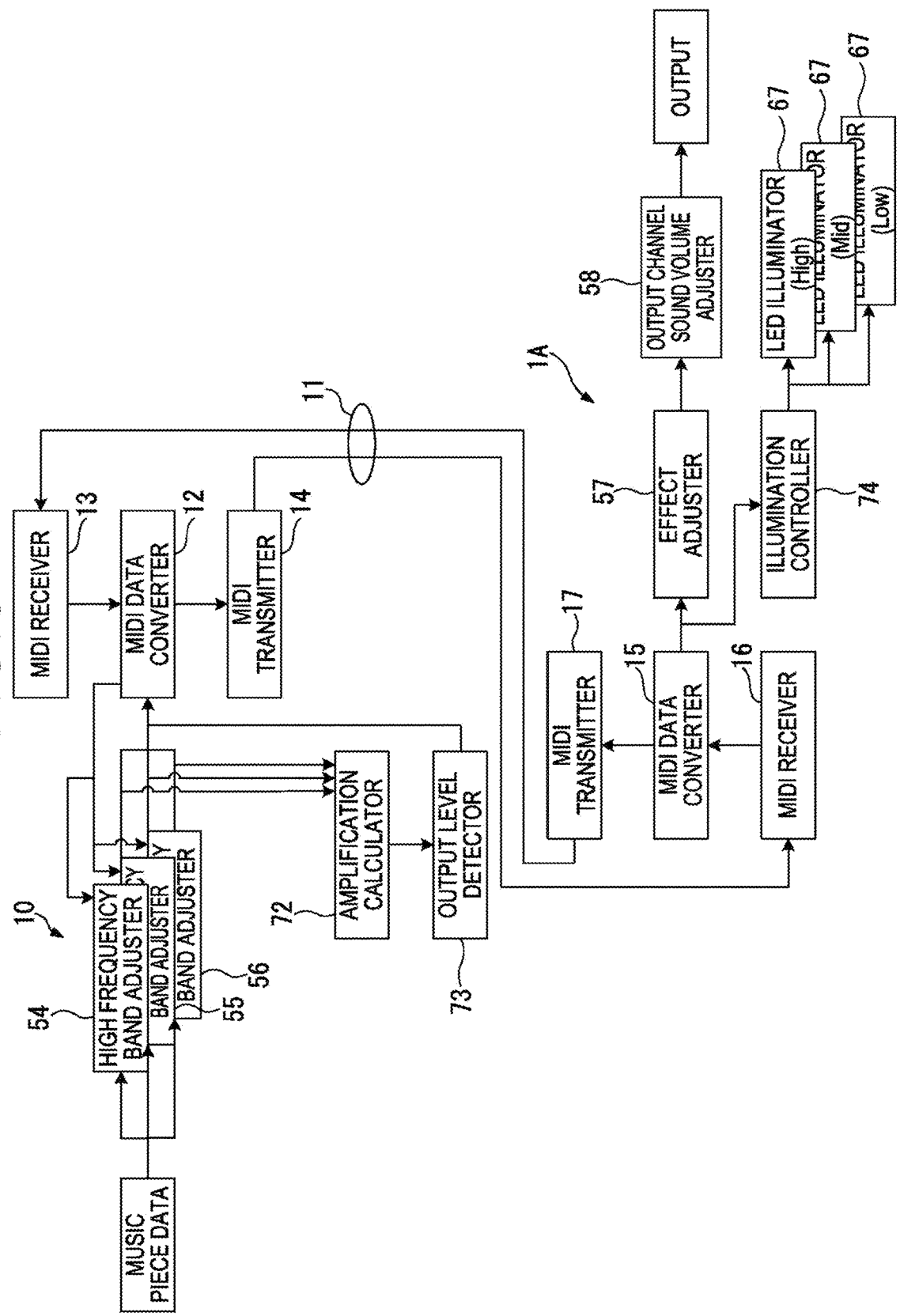

11,347,468 B2

SOUND VOLUME OPERATION DEVICE

TECHNICAL FIELD

The present invention relates to a sound volume operation device.

BACKGROUND ART

In DJ performance, an operator operates a controller, a mixer and the like to mix a music piece being played with another music piece, or operates a jog dial and the like to perform performance such as scratching, fast-forwarding or reversing of the music pieces.

Following the recent technological developments, various functions are added to a sound volume operation device such as a mixer. The functions include not only switching sound sources connected to each channel of the mixer and adjusting a sound volume of each of the sound sources, but also adjusting, as an equalizer, the sound volume in a low frequency band, a medium frequency band and a high frequency band in each channel.

It is important for DJ performance that the operator checks states of the sound volume adjustment done by the equalizer in the low frequency band, the medium frequency band and the high frequency band. However, since the mixer, which is used in the DJ performance and the like, includes a large number of operation buttons, knobs and the like, a display area of a level meter that indicates the sound volume in each of the frequency bands cannot be ensured on the mixer. Further, since no display that indicates the adjusted sound volume in each of the frequency bands is provided, typically, the equalizer has been adjusted by listening to the adjusted sounds for a judgement or visually checking the level meter that indicates the sound volumes in all the frequencies.

Accordingly, Patent Literature 1 discloses a technology of an audio amplifier including a volume knob configured to illuminate in different illumination colors according to gain setting values.

Further, Patent Literature 2 discloses a technology of displaying a sound volume set in response to an operation of a sound volume switch only for a predetermined time.

CITATION LIST

Patent Literature(s)
Patent Literature 1: JP 2005-198356 A
Patent Literature 2: JP 2002-116761 A

SUMMARY OF THE INVENTION

Problem(s) to be Solved by the Invention

However, the technology disclosed in Patent Literature 1 displays only according to the gain setting values, which is thus not according to output sound volume levels after amplification. Accordingly, it is impossible to make such an adjustment as to match sound volume levels done in actual DJ performance.

Further, the technology disclosed in Patent Literature 2 can only display whether the sound volume based on the gain setting values is larger or smaller than the set sound volume level.

An object of the invention is to provide a compact sound volume operation device that, even when used in DJ performance and the like, allows an operator to easily visually check output sound volume levels that are outputted according to the setting of a sound volume operating unit.

Means for Solving the Problems

A sound volume operation device according to an aspect of the invention configured to amplify and output an inputted acoustic signal includes: at least one sound volume adjuster configured to adjustably amplify an input sound volume level of the inputted acoustic signal; an output level detector configured to detect an output sound volume level of the acoustic signal amplified by the at least one sound volume adjuster; and an illuminator provided at or adjacent to the at least one sound volume adjuster and configured to provide a different illumination state according to the output sound volume level detected by the output level detector.

EXPLANATION OF CODES

Figure 7A:
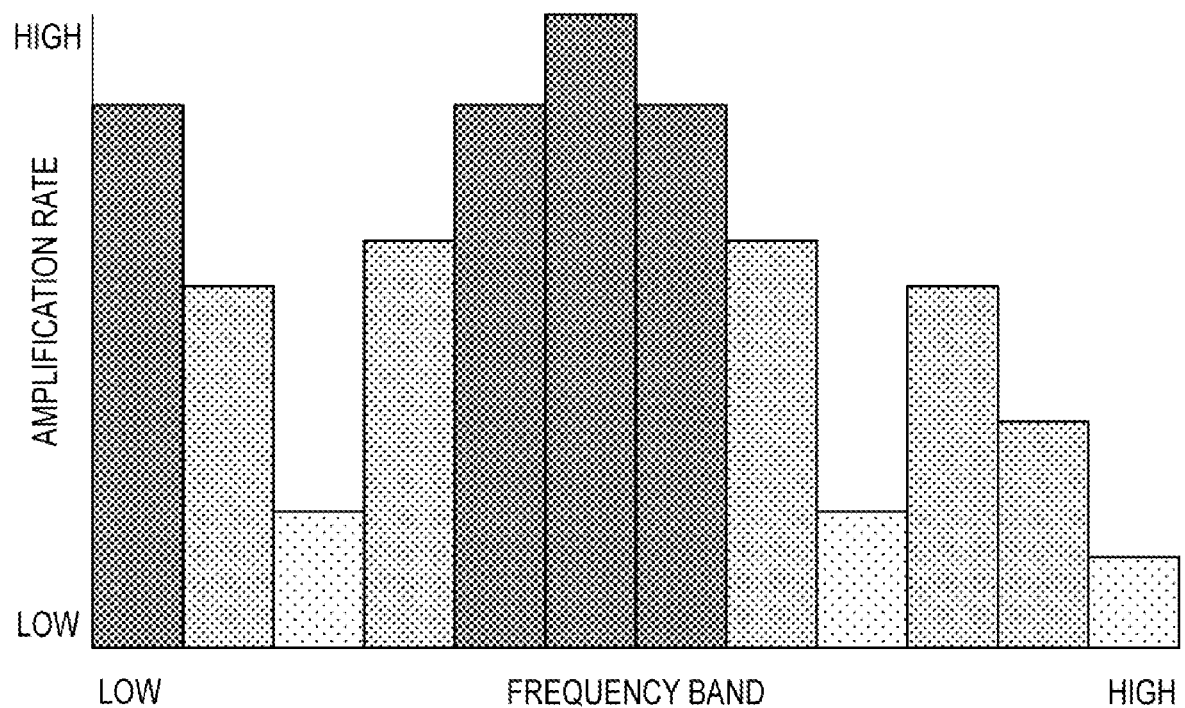

FIG. 7A schematically shows a display screen of a typical graphic equalizer.

Figure 7B:
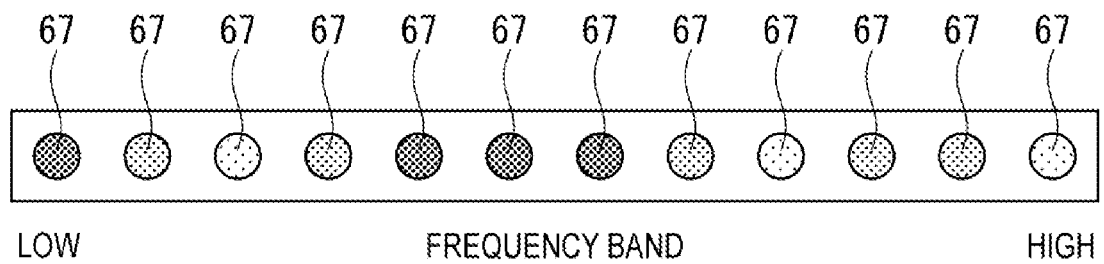

FIG. 7B schematically shows a graphic equalizer according to a fourth exemplary embodiment of the invention.

FIG. 8 is a block diagram showing a structure of a sound volume operation device according to a fifth exemplary embodiment of the invention.

DESCRIPTION OF EMBODIMENT(S)

[1] Overall Configuration

Figure 1:
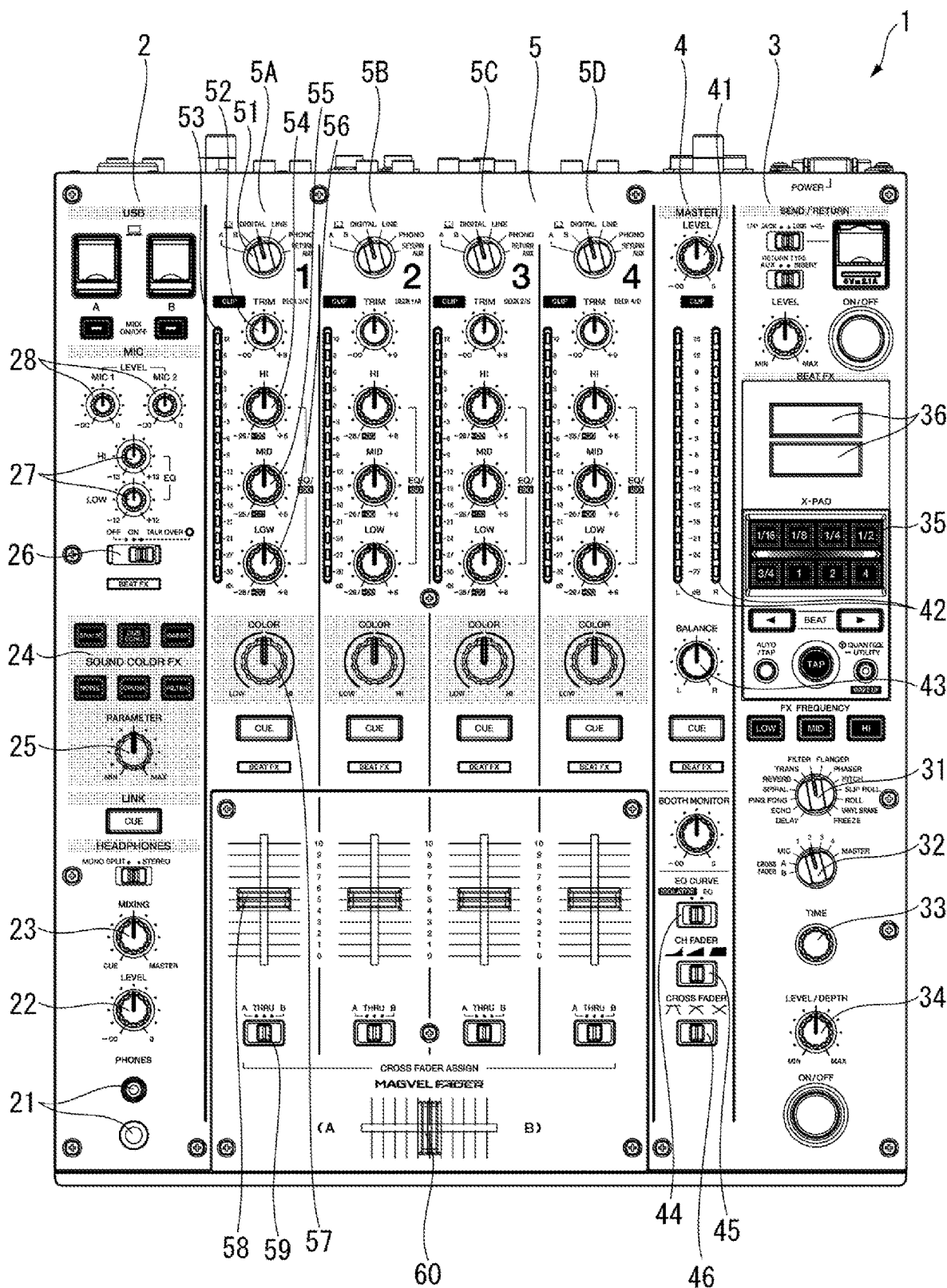
FIG. 1 is a top plan view showing a structure of a DJ mixer according to a first exemplary embodiment of the invention.

A first exemplary embodiment of the invention is described below with reference to the attached drawings. FIG. 1 shows a DJ mixer 1 according to the first exemplary embodiment of the invention. Though not illustrated, the DJ mixer 1 is connected to a music piece player (e.g., a vinyl record player, a CD player or a computer) configured to reproduce music piece data, and a music piece operation device (e.g., a DJ controller). Further, an acoustic device (e.g., a speaker) is connected to an output side of the DJ mixer 1.

The music piece data in a form of an acoustic signal are reproduced by the music piece player or the music piece operation device, and inputted to the DJ mixer 1 serving as a sound volume operation device. The DJ mixer 1 performs effect processing to the inputted music piece data. After amplifying the music piece data subjected to the effect processing and then converting the amplified music piece data to an analog signal, the DJ mixer 1 outputs sounds from the acoustic device.

The DJ mixer 1 includes a microphone operating unit 2, an effect operating unit 3, a master adjuster 4 and an equalizer adjuster 5.

The microphone operating unit 2 adjusts an output sound volume of a microphone (not shown) connected to the DJ mixer, and starts and stops effect processing by the effect operating unit 3. In addition, the microphone operating unit 2 is connected to a headphone so that an operator monitors an output sound volume of the music piece data outputted from the DJ mixer 1. The microphone operating unit 2 includes a headphone jack 21, a headphone sound volume adjuster 22, a mixing adjuster 23, a master effect switching unit 24, a master effect amount adjuster 25, a microphone switching unit 26, a microphone equalizer adjuster 27 and a microphone sound volume adjuster 28.

The headphone is connected to the headphone jack 21 so that the operator of the DJ mixer 1 monitors, through the headphone, the music piece data outputted from each channel and final music piece data outputted from the master adjuster 4.

The headphone sound volume adjuster 22 adjusts a sound volume outputted from the headphone.

The mixing adjuster 23 adjusts balance of the sound volume outputted from the headphone between an output sound volume of a channel whose CUE button is pressed and a sound volume of a master channel.

The master effect switching unit 24 selects an effect applied to the entire music piece data inputted from all channels connected to the equalizer adjuster 5. In the present exemplary embodiment, the effect such as noise, sweep or crush can be selected.

The master effect amount adjuster 25 adjusts the applied amount and the depth of the effect selected by the master effect switching unit 24.

The microphone switching unit 26 switches on and off of the microphone connected to the DJ mixer 1. The microphone equalizer adjuster 27 adjusts an output sound volume of acoustic data outputted from the microphone according to frequencies.

The microphone sound volume adjuster 28 adjusts the output sound volume of the acoustic data outputted from the microphone.

The effect operating unit 3 performs effect processing to the inputted music piece data. The effect operating unit 3 includes an effect switching unit 31, a channel switching unit 32, an effect time setting unit 33, an effect amount adjuster 34, a magnification setting unit 35 and a display 36.

The effect switching unit 31 is a switch configured to select an effect applied to the music piece data. This operation allows effect processing such as echo, delay, reverb or flanger to be selected.

The channel switching unit 32 selects at least one of a plurality of channels provided on the equalizer adjuster 5 to apply an effect to the inputted music piece data.

The effect time setting unit 33 sets a time at which the effect selected by the effect switching unit 31 is applied to the music piece data.

The effect amount adjuster 34 adjusts the applied amount and the depth of the effect selected by the effect switching unit 31.

The magnification setting unit 35 sets beat magnification, at which timings for applying the effect are synchronized, based on BPM of the inputted music piece data. The magnification setting unit 35 can apply the effect to the music piece data at the timings in synchronization with, for instance, one beat, two beats, ½ beat or ¼ beat of BPM of the music piece data.

The display 36 displays the selected effect and the BPM of the inputted music piece data to be visually checked by the operator. In the present exemplary embodiment, the display 36 displays the name of the effect selected by the effect switching unit 31, the BPM of the music piece data and the beat magnification set by the magnification setting unit 35.

The master adjuster 4 applies the effect outputted from the DJ mixer 1 and adjusts the entire amplified music piece data. The master adjuster 4 includes a master sound volume adjuster 41, level indicators 42, a master sound volume balance adjuster 43, an equalizer switching unit 44, a channel fader switching unit 45 and a cross fader switching unit 46.

The master sound volume adjuster 41 adjusts the entire output sound volume of the music piece data outputted from the DJ mixer 1.

The level indicators 42 respectively display the right and left output sound volumes of the music piece data outputted from the DJ mixer 1.

The channel fader switching unit 45 switches curve characteristics when channels of the equalizer adjuster 5 are switched. For instance, when a first channel of the channels is switched to a second channel, the channel fader switching unit 45 can select the curve characteristics such as gradually decreasing a sound volume of the first channel before the switching and gradually increasing a sound volume of the second channel after the switching, or suddenly switching the channels.

The cross fader switching unit 46 switches the curve characteristics in a later-described switching by the cross fader 60. For instance, in response to the switching operation by the cross fader 60, the cross fader switching unit 46 can perform a sudden switching from the music piece data of the pre-switching to the music piece data of the post-switching, or perform a switching to output both of the above-described music piece data at half of the sound volume between the pre-switching and the post-switching.

The equalizer adjuster 5 performs equalizer processing to the music piece data inputted from the music piece player connected to the DJ mixer for each channel. The equalizer adjuster 5 includes a first adjuster 5A, a second adjuster 5B, a third adjuster 5C and a fourth adjuster 5D, which adjust four channels, namely, a channel 1, a channel 2, a channel 3 and a channel 4, respectively.

The first adjuster 5A, the second adjuster 5B, the third adjuster 5C and the fourth adjuster 5D, which are each connected to the music piece player and the music piece operation device, can each perform an equalizer adjustment. The first adjuster 5A, the second adjuster 5B, the third adjuster 5C and the fourth adjuster 5D each include an input switching unit 51, an input channel sound volume adjuster 52, a channel level indicator 53, a high frequency band adjuster 54, a medium frequency band adjuster 55, a low frequency band adjuster 56, an effect adjuster 57, an output channel sound volume adjuster 58 and a cross fader switching unit 59. The equalizer adjuster 5 further includes the cross fader 60.

The input switching unit 51 switches input sources for the music piece player and the music piece operation device connected to the DJ mixer 1. Specifically, the input switching unit 51 switches the connected devices between the vinyl record player connected to a phone jack, the CD player connected to a line jack, a computer connected to a USB jack, and the like, the phone jack, the line jack and the USB jack being on the DJ mixer 1.

The input channel sound volume adjuster 52 adjusts an input sound volume of the connected device selected by the input switching unit 51.

The channel level indicator 53 displays the input sound volume of the inputted music piece data from the connected device.

The high frequency band adjuster 54 adjusts the sound volume of the inputted music piece data in a high frequency band. The high frequency band adjuster 54 adjusts the sound volume in the high frequency band, for instance, at a frequency of 4649 Hz or higher.

The medium frequency band adjuster 55 adjusts the sound volume of the inputted music piece data in a medium frequency band. The medium frequency band adjuster 55 adjusts the sound volume in the medium frequency band, for instance, at a frequency of higher than 284 Hz and lower than 4649 Hz.

The low frequency band adjuster 56 adjusts the sound volume of the inputted music piece data in a low frequency band. The low frequency band adjuster 56 adjusts the sound volume in the low frequency band, for instance, at a frequency of 284 Hz or lower.

The effect adjuster 57 adjusts an applied amount and depth of an effect set at each of the first adjuster 5A, the second adjuster 5B, the third adjuster 5C and the fourth adjuster 5D.

The output channel sound volume adjuster 58 adjusts an output sound volume outputted from each of the first adjuster 5A, the second adjuster 5B, the third adjuster 5C and the fourth adjuster 5D.

The cross fader switching unit 59 performs switching between an A side (right side) and a B side (left side) of the cross fader 60. The first adjuster 5A, the second adjuster 5B, the third adjuster 5C and the fourth adjuster 5D each output the music pieces to either the A side or the B side.

The cross fader 60 performs switching between at least one of the music pieces outputted from the corresponding channels switched to the A side (right side) and the rest of the music pieces outputted from the corresponding channels switched to the B side (left side).

[2] Detailed Configuration of Illuminator

An adjusting knob 6 forming each of the above-described high frequency band adjuster 54, medium frequency band adjuster 55, and low frequency band adjuster 56 illuminates the surroundings of the adjusting knob in different colors according to an output sound volume level of corresponding one of the frequency bands. In other words, the adjusting knob 6 functions as a graphic equalizer configured to emit different colors of light according to the output sound volume level.

Figure 2A:
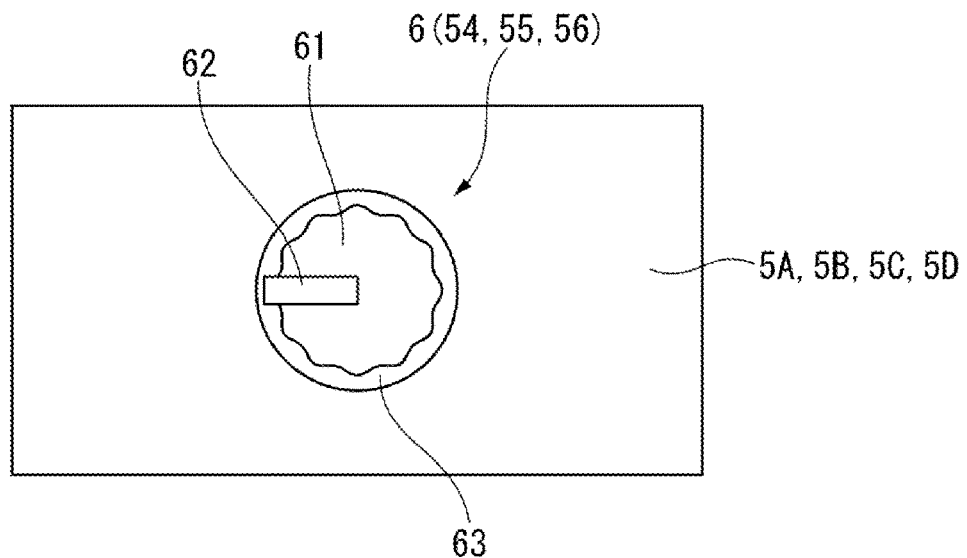
FIG. 2A is a top plan view showing a structure of an adjusting knob according to the first exemplary embodiment.
Figure 2B:
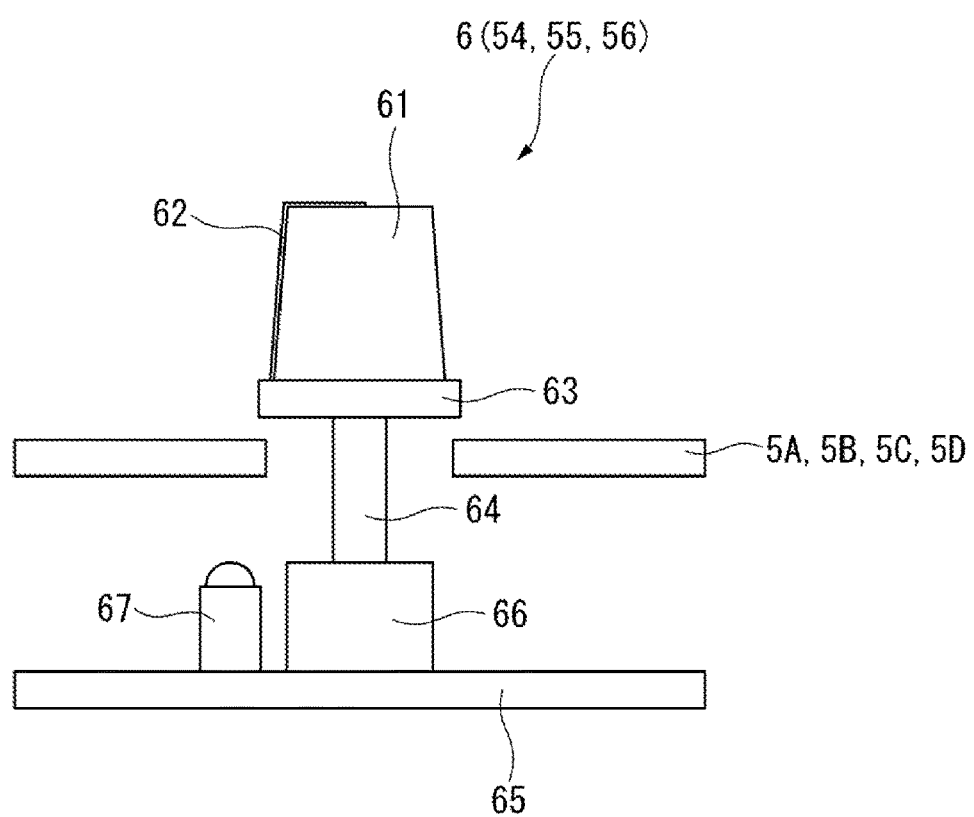
FIG. 2B is a cross section showing the structure of the adjusting knob according to the first exemplary embodiment.

Specifically, as shown in FIG. 2A, the adjusting knob 6 forming each of the high frequency band adjuster 54, the medium frequency band adjuster 55, and the low frequency band adjuster 56 includes an operation knob body 61, an adjusting position indicating marker 62 and a knob base 63.

The operation knob body 61 is made of a non-light-transmissive material such as black rubber, and is rotatably held on a casing of each of the first adjuster 5A, the second adjuster 5B, the third adjuster 5C and the fourth adjuster 5D.

The adjusting position indicating marker 62 and the knob base 63 are made of a light guiding material such as a lens material. In other words, the adjusting position indicating marker 62 and the knob base 63 function as light guides configured to illuminate the surroundings of the operation knob body 61 and the adjusting position indicating marker 62 in line with illumination colors of illumination by a later-described LED illuminator 67.

The adjusting position indicating marker 62 is disposed in a slit formed in the operation knob body 61, so that the operator visually checks an adjustment amount caused when the operation knob body 61 is rotated.

The knob base 63 is disposed at a bottom of the operation knob body 61 and supported so that the knob base 63 is rotated in accordance with the rotation of the operation knob body 61. Further, a radially outer peripheral edge of the knob base 63 protrudes outward from the operation knob body 61.

A rotation shaft 64 is disposed at a rotation center of the knob base 63, and a lower end of the rotation shaft 64 is connected to a rotary potentiometer 66 disposed on a circuit board 65. The rotary potentiometer 66 is disposed adjacent to the LED illuminator 67 configured to illuminate in a plurality of colors.

The LED illuminator 67, which is an illuminator, illuminates in different colors by illuminating in a single one or a combination of red, green and blue colors.

[3] Functional Block Diagram of Equalizer Adjuster 5

Figure 3:
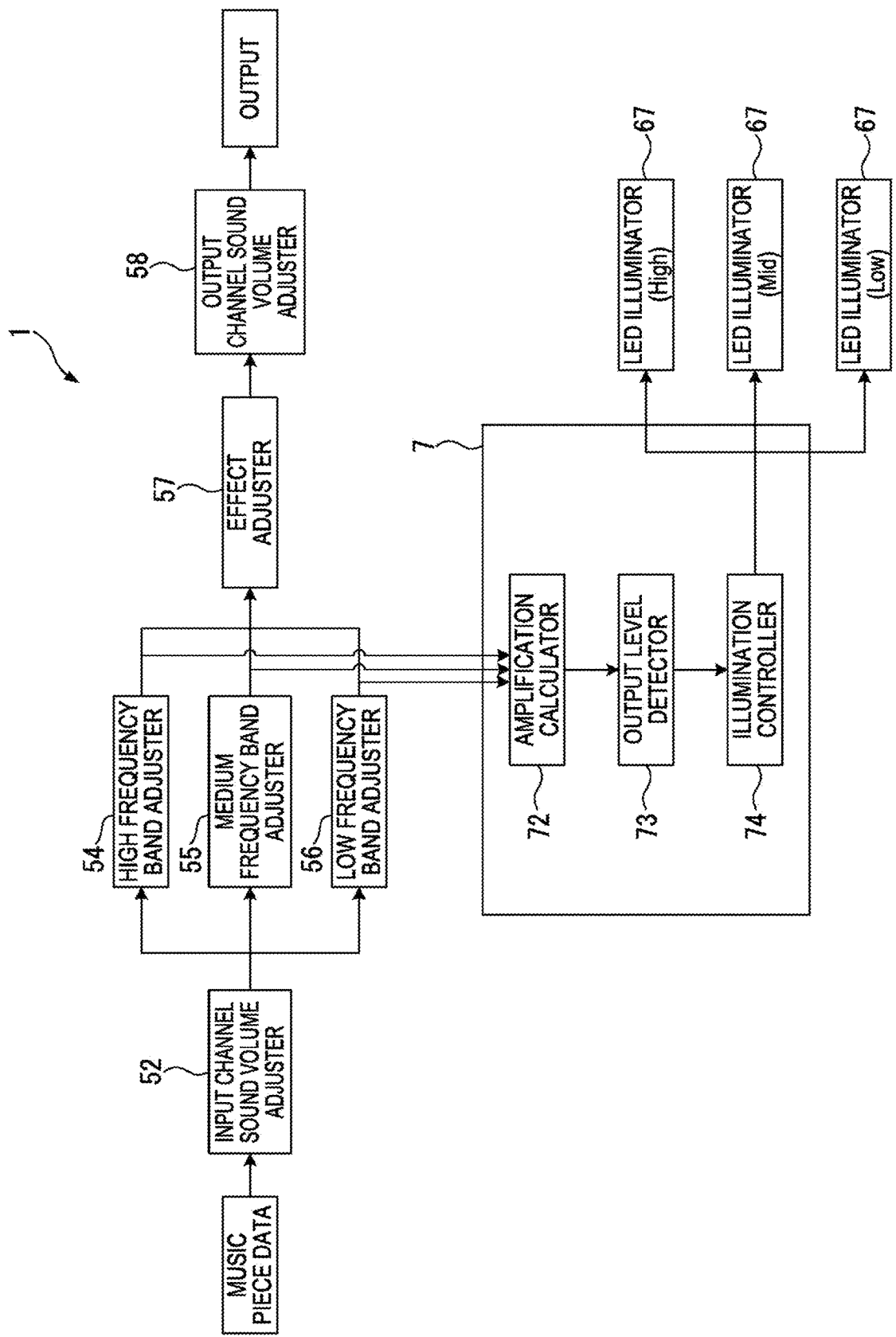
FIG. 3 is a functional block diagram of the DJ mixer according to the first exemplary embodiment.

FIG. 3 shows a functional block diagram of the first adjuster 5A, the second adjuster 5B, the third adjuster 5C and the fourth adjuster 5D forming the equalizer adjuster 5.

A controller 7 configured to control the DJ mixer 1 adjusts the inputted music piece data in response to operations of adjusting knobs of various adjusters shown in FIG. 1, and controls LED illuminators 67 to illuminate in response to operations of adjusting knobs of the equalizer adjuster 5. The controller 7 includes an amplification calculator 72, an output level detector 73 and an illumination controller 74.

The amplification calculator 72 amplifies input sound volume levels of the inputted acoustic signal with amplification rates set by the respective high frequency band adjuster 54, medium frequency band adjuster 55 and low frequency band adjuster 56, thereby generating output sound volume levels corresponding to the respective frequency bands. It should be noted that in the present exemplary embodiment, the amplification rate is calculated based on an RMS (root mean square) value that is equivalent to a sound volume heard by human ears. It should also be noted that the amplification rate may be calculated based on another displayed value such as a peak value, a VU value or a loudness value.

The output level detector 73 detects the output sound volume levels in the high frequency band, the medium frequency band and the low frequency band, which are amplified by the amplification calculator 72.

The illumination controller 74 determines illumination states for the high frequency band, the medium frequency band and the low frequency band on a basis of the output sound volume levels detected by the output level detector 73, thereby outputting a control signal to each of the LED illuminator 67 for the high frequency band (High), the LED illuminator 67 for the medium frequency band (Mid) and the LED illuminator 67 for the low frequency band (Low).

For instance, in a case where the output sound volume level is at a reference sound volume level of −48 dB, the illumination controller 74 determines that the corresponding LED illuminator 67 illuminates in white or does not illuminate. In other cases, the illumination controller 74 determines that the LED illuminator 67 illuminates in illumination colors with different hues. Specifically, the illumination controller 74 determines illumination in green in a case where the output sound volume level is more than −48 dB and −24 dB or less in a reference sound volume level, determines illumination in orange in a case where the output sound volume level is more than −24 dB and −3 dB or less in the reference sound volume level, and determines illumination in red in a case where the output sound volume level is more than −3 dB in the reference sound volume level.

[4] Operations and Effects of First Exemplary Embodiment

Figure 4:
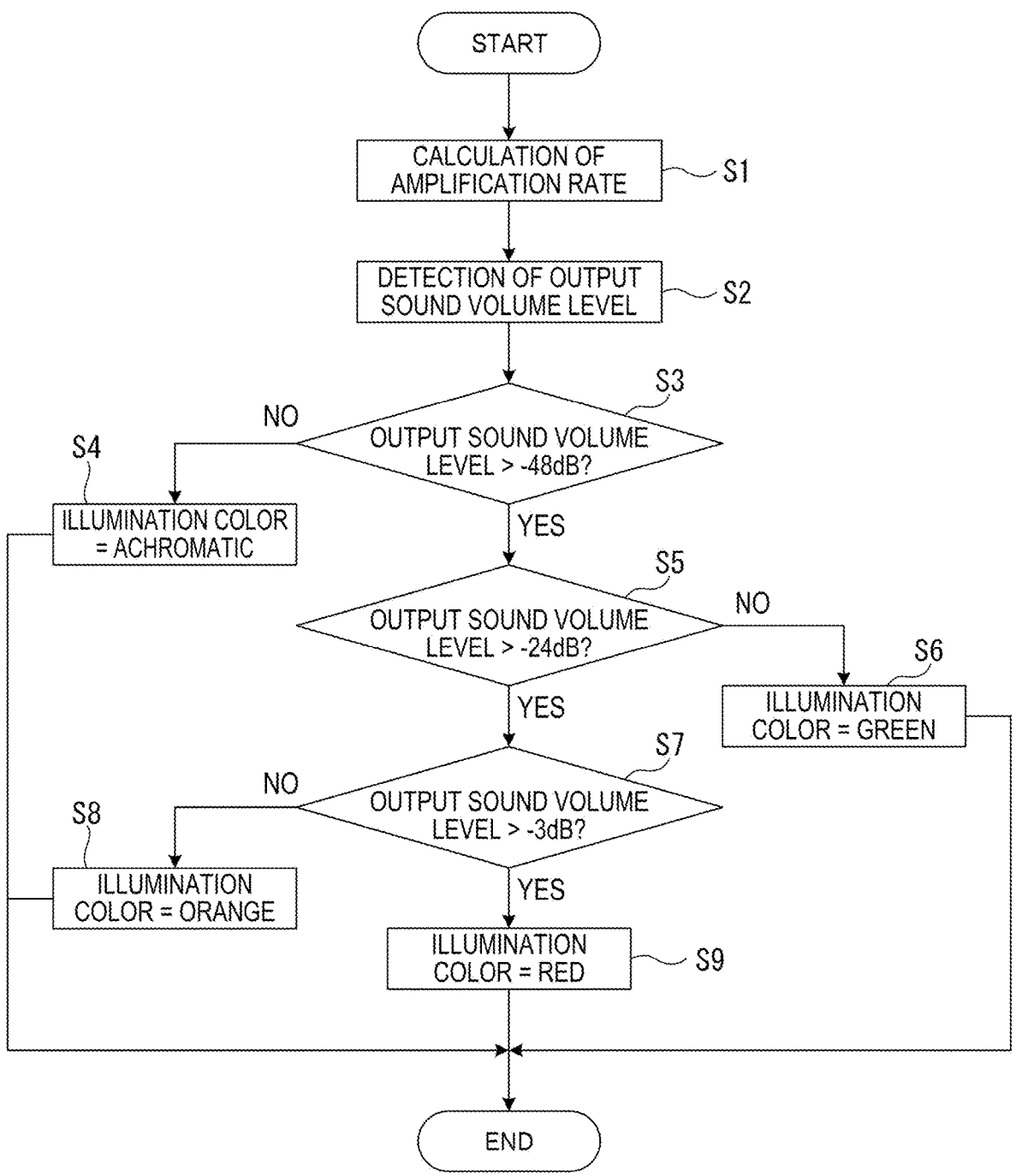
FIG. 4 is a flowchart for explaining operations in the first exemplary embodiment.

Next, operations of the present exemplary embodiment will be described with reference to a flowchart shown in FIG. 4. It should be noted that steps in the flowchart shown in FIG. 4 are performed in parallel for each of the high frequency band, the medium frequency band and the low frequency band.

The amplification calculator 72 generates output sound volume levels in the respective frequency bands according to the amplification rates set by the respective high frequency band adjuster 54, medium frequency band adjuster 55 and low frequency band adjuster 56 (Step S1).

The output level detector 73 detects the output sound volume levels of the music piece data amplified by the high frequency band adjuster 54, the medium frequency band adjuster 55 and the low frequency band adjuster 56 (Step S2).

The illumination controller 74 determines whether the output sound volume level is more than the reference sound volume level of −48 dB (Step S3). When the output sound volume level is not more than the reference sound volume level of −48 dB, the illumination controller 74 sets the illumination color to be an achromatic color (e.g., white) and outputs a control signal to the corresponding LED illuminator 67 (Step S4).

Next, the illumination controller 74 determines whether the output sound volume level is more than the reference sound volume level of −24 dB (Step S5). When the output sound volume level is not more than the reference sound volume level of −24 dB, the illumination controller 74 sets the illumination color to be green and outputs a control signal to the corresponding LED illuminator 67 (Step S6).

Further, the illumination controller 74 determines whether the output sound volume level is more than the reference sound volume level of −3 dB (Step S7). When the output sound volume level is not more than the reference sound volume level of −3 dB, the illumination controller 74 sets the illumination color to be orange and outputs a control signal to the corresponding LED illuminator 67 (Step S8).

When the output sound volume level is more than the reference sound volume level of −3 dB, the illumination controller 74 sets the illumination color to be red and outputs a control signal to the corresponding LED illuminator 67 (Step S9).

The following effects are obtained in the above-described exemplary embodiment.

The illumination controller 74 illuminates the LED illuminators 67 for the adjusting knobs 6 in predetermined illumination colors based on the output sound volume levels detected by the output level detector 73. Accordingly, the operator can operate the DJ mixer 1 while visually checking the output sound volume levels in the high frequency band, medium frequency band and low frequency band.

Since the LED illuminators 67 are provided with the adjusting knobs 6 of the high frequency band adjuster 54, the medium frequency band adjuster 55 and the low frequency band adjuster 56, adjustment amounts in the frequency bands can be seen adjacent to the respective adjusters 54, 55 and 56. Accordingly, the operator can check an adjustment state of each of the adjusters 54, 55 and 56 by the illumination colors, and thus can do DJ performance with preferable operability.

When at least one of the output sound volume levels is at the reference sound volume level of −48 dB or less, or at a sound volume level almost inaudible, the illumination controller 74 sets the illumination color of the corresponding LED illuminator(s) 67 to be an achromatic color, which normally facilitates being distinguished from the other LED illuminator(s) 67 illuminating in chromatic colors. Consequently, when the operator performs an equalizer adjustment, the operator can easily visually check that there is no input, or the adjusting knobs 6 of the high frequency band adjuster 54, the medium frequency band adjuster 55 and the low frequency band adjuster 56 are completely turned down.

[5] Second Exemplary Embodiment

Next, description is made on a second exemplary embodiment of the invention. It should be noted that in the following, description of the same portions as those described above will be omitted.

In the above-described first exemplary embodiment, the adjusting position indicating marker 62 and the knob base 63 are made of a light-transmissive material, and irradiated with light emitted by the LED illuminator 67 to illuminate in a desired illumination color.

Figure 5A:
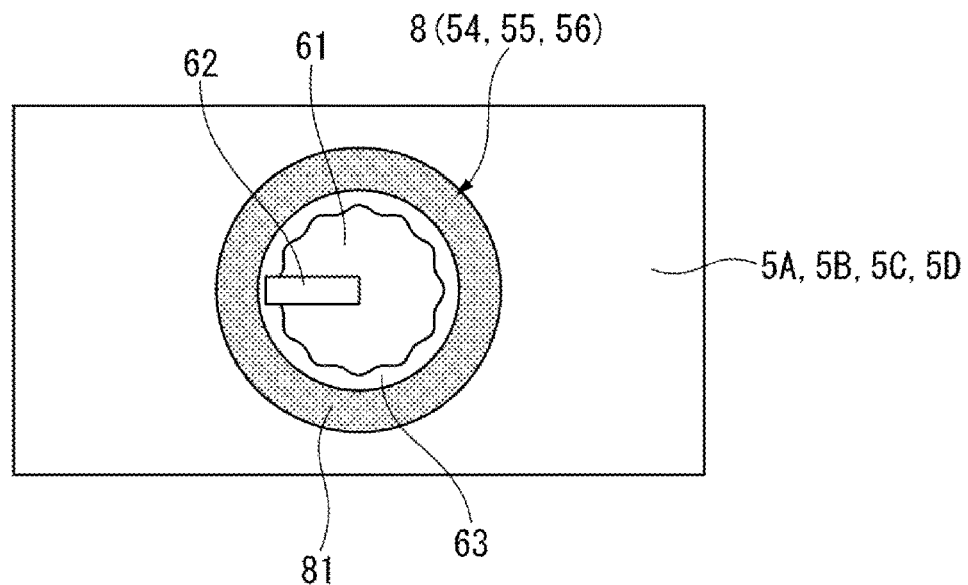
FIG. 5A is a top plan view showing a structure of an adjusting knob according to a second exemplary embodiment of the invention.
Figure 5B:
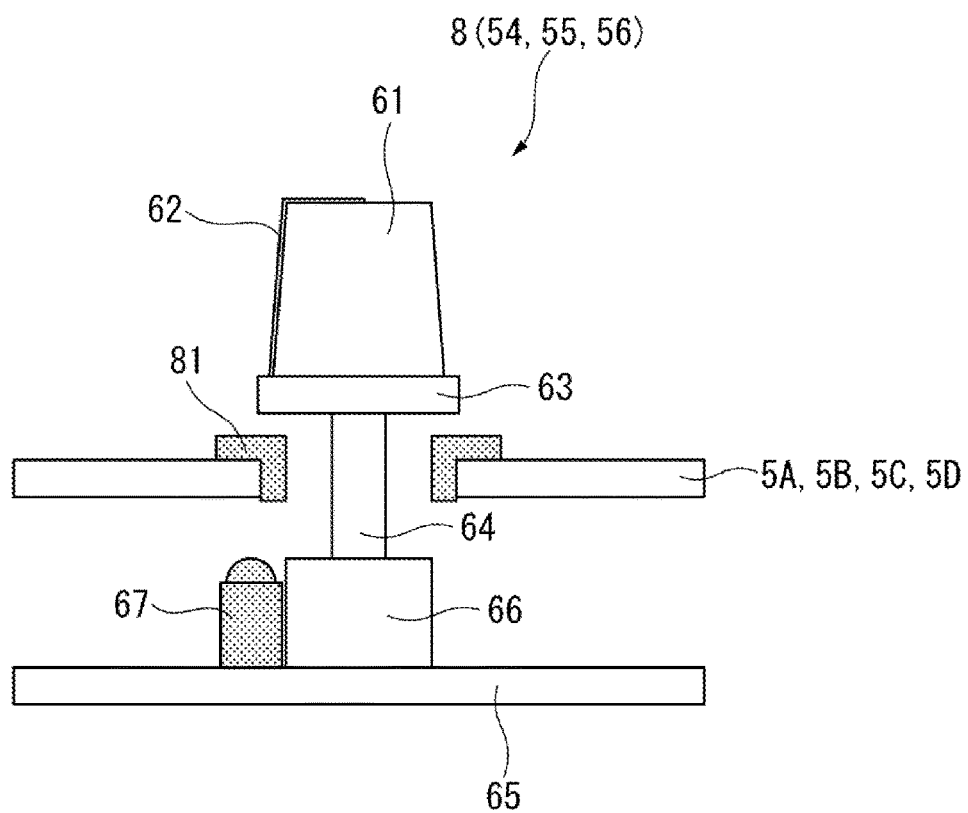
FIG. 5B is a cross section showing the structure of the adjusting knob according to the second exemplary embodiment.
Figure 6A:
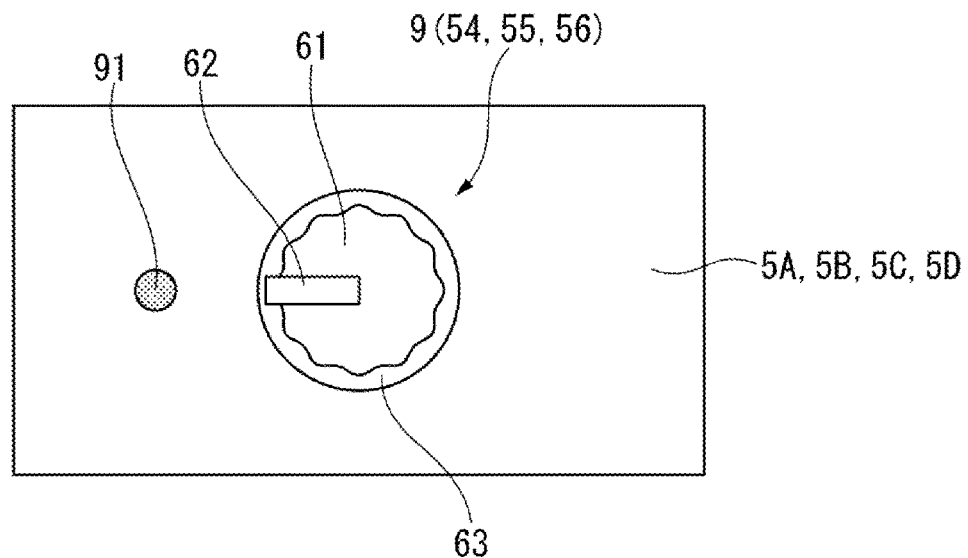
FIG. 6A is a top plan view showing a structure of an adjusting knob according to a third exemplary embodiment of the invention.
Figure 6B:
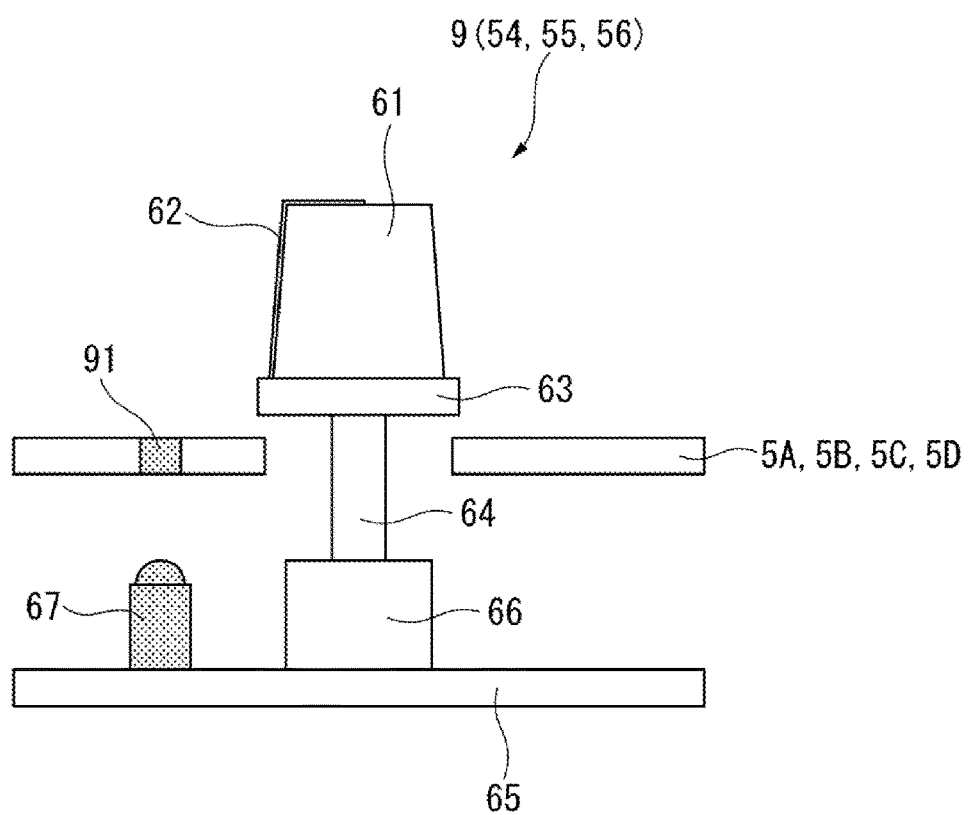
FIG. 6B is a cross section showing the structure of the adjusting knob according to the third exemplary embodiment.

Meanwhile, as shown in FIGS. 5A and 5B, the present exemplary embodiment differs from the first exemplary embodiment in that in the former, a light guide 81 is provided around an adjusting knob 8 and also irradiated with light emitted by the LED illuminator 67.

The light guide 81 is disposed in a hole through which an adjusting knob 7 formed on a casing of the first adjuster 5A, the second adjuster 5B, the third adjuster 5C and the fourth adjuster 5D of the equalizer adjuster 5 is fixed. The light guide 81 is in a form of a ring made of a light-transmissive material, and further includes a rib provided to an inner side of the ring and protruding downward. For an attachment of the light guide 81, an end of the rib is fitted in the hole of the casing, and subsequently the adjusting knob 8 is fixed.

The same operations and effects as the above-described operations and effects can be achieved also by the second exemplary embodiment.

In addition, since the light guide 81 is disposed around the adjusting knob 8, illumination colors can also be spread outward of the adjusting knob 8, which are more easily visually checked by the operator.

[6] Third Exemplary Embodiment

Next, description is made on a third exemplary embodiment of the invention.

In the above-described first exemplary embodiment, the adjusting position indicating marker 62 and the knob base 63 are made of a light-transmissive material, and irradiated with light emitted by the LED illuminator 67 to illuminate in a desired illumination color.

Meanwhile, the present exemplary embodiment differs from the first exemplary embodiment in that in the former, a hole 91 is provided adjacent to an adjusting knob 9 forming each of the high frequency band adjuster 54, the medium frequency band adjuster 55 and the low frequency band adjuster 56. The hole 91 is provided so as to penetrate through the casing of each of the first adjuster 5A, the second adjuster 5B, the third adjuster 5C and the fourth adjuster 5D from the inside to the outside. The LED illuminator 67 is disposed immediately below and inside the hole 91.

The same operations and effects as the above-described operations and effects can be achieved by the third exemplary embodiment.

[7] Fourth Exemplary Embodiment

Next, description is made on a fourth exemplary embodiment of the invention.

In a typical graphic equalizer, when the amplification rates of the sound volume levels in the respective frequency bands are visually displayed, the amplification rates corresponding to the frequency bands are displayed in a histogram on a liquid crystal display or the like, as shown in FIG. 7A. However, a display area has to be larger in such a displaying method, which hampers reliably obtaining the display area in the DJ mixer 1 of the first exemplary embodiment.

In this regard, in the present exemplary embodiment, the LED illuminators 67 whose illumination colors are different depending on the frequency bands are provided, thereby causing the LED illuminators 67 to illuminate in different colors according to the amplification rates of the sound volume levels in the respective frequency bands, as shown in FIG. 7B. In other words, in the present exemplary embodiment, the LED illuminators 67 function as a display unit of the graphic equalizer by changing the illumination colors of the LED illuminators 67.

This configuration enables the function as a graphic equalizer to be achieved in a narrow area. Accordingly, even when a display area cannot be ensured as in the DJ mixer 1 of the first exemplary embodiment, the operator can visually check the amplification rates of the sound volume levels in the respective frequency bands.

[8] Fifth Exemplary Embodiment

Next, description is made on a fifth exemplary embodiment of the invention.

In the above-described first exemplary embodiment, the illumination of the LED illuminators 67 is controlled only by internal processing of the DJ mixer 1.

In contrast, the present exemplary embodiment differs from the first exemplary embodiment in that the former includes a computer 10 and a DJ mixer 1A, and the computer 10 is connected to the DJ mixer 1 via MIDI (Musical Instrument Digital Interface) cables 11, which are lines according to the MIDI standard, thereby achieving the function of the invention as a whole system, as shown in FIG. 8.

The computer 10 converts an operation signal outputted in the MIDI code from the DJ mixer 1A into a signal that can be processed by the computer 10 to perform various types of processing. The computer 10 converts results processed by the computer into the MIDI code and outputs the MIDI code to the DJ mixer 1A, thereby performing control processing of the DJ mixer 1A. Accordingly, the computer 10 includes a MIDI data converter 12, a MIDI receiver 13 and a MIDI transmitter 14.

The computer 10 further includes the high frequency band adjuster 54, the medium frequency band adjuster 55 and the low frequency band adjuster 56. The high frequency band adjuster 54, the medium frequency band adjuster 55 and the low frequency band adjuster 56 are provided to adjust a volume of the music piece data reproduced at the computer 10 or the music piece data inputted from the outside in the respective frequency bands.

When the operator turns adjusting knobs of the DJ mixer 1A to adjust the sound volume levels to desired sound volume levels, the DJ mixer 1A converts rotation amounts into MIDI data to be transmitted to the computer 10 via one of the MIDI cables 11.

In the computer 10, the MIDI receiver 13 receives the MIDI data and the MIDI data converter 12 converts the received MIDI data into data that can be processed by the computer 10. The conversion results are inputted to the high frequency band adjuster 54, the medium frequency band adjuster 55 and the low frequency band adjuster 56 and adjusted at the amplification rates corresponding to the rotations of the adjusting knobs.

The computer 10 further includes an input level detector 71, an amplification calculator 72 and an output level detector 73.

The input level detector 71 detects the input sound volume levels of the music piece data in the respective high frequency band, medium frequency band and low frequency band.

The amplification calculator 72 amplifies the input sound volume levels of the inputted acoustic signal with amplification rates set by the respective high frequency band adjuster 54, medium frequency band adjuster 55 and low frequency band adjuster 56, thereby generating output sound volume levels corresponding to the frequency bands.

The output level detector 73 detects the output sound volume levels in the high frequency band, the medium frequency band and the low frequency band, which are amplified by the amplification calculator 72.

The results detected by the output level detector 73 are converted into MIDI data by the MIDI data converter 12, and transmitted to the DJ mixer 1A from the MIDI transmitter 14 via the other of the MIDI cables 11.

The DJ mixer 1A, which is an operating unit body, includes a MIDI data converter 15, a MIDI receiver 16 and a MIDI transmitter 17 in addition to the effect adjuster 57, the output channel sound volume adjuster 58, the illumination controller 74 and the LED illuminators 67.

The MIDI data converter 15 converts the received MIDI data into data that can be processed by the DJ mixer 1A, or converts operation results of the DJ mixer 1A into MIDI data, these converted data being transmitted to the computer 10 via one of the MIDI cables 11.

The MIDI receiver 16 receives the MIDI data transmitted from the computer 10 and outputs the MIDI data to the MIDI converter 15.

The MIDI transmitter 17 transmits, for instance, rotation amounts of operations of the adjusting knobs of the DJ mixer 1A to the computer 10 via one of the MIDI cables 11.

The output sound volume levels detected by the output level detector 73 of the computer 10 are transmitted to the DJ mixer 1A via the other of the MIDI cables 11. The output sound volume levels are received by the MIDI receiver 16, and subsequently converted by the MIDI data converter 15 to be outputted to the illumination controller 74.

The illumination controller 74 outputs illumination colors illuminated by the LED illuminators 67 for the high frequency band, the medium frequency band and the low frequency band to the LED illuminators 67 as control signals according to the respective output sound volume levels calculated for the high frequency band, the medium frequency band and the low frequency band.

The same operations and effects as the above-described operations and effects can be achieved by the fifth exemplary embodiment.

[9] Modifications of Exemplary Embodiments

It should be noted that the invention is not limited to the above-described exemplary embodiments, and includes the following modifications.

In the above-described first exemplary embodiment, the invention is applied to the adjusting knobs 6 configured to perform sound volume adjustments for the high frequency band adjuster 54, the medium frequency band adjuster 55, the low frequency band adjuster 56 provided with the equalizer adjuster 5, but not limited thereto. The invention may be applied to an adjusting knob of, for instance, the master sound volume adjuster 41 of the master adjuster 4 of the DJ mixer 1.

In the above-described first embodiment, the invention is applied to the rotary adjusting knob 6, but not limited thereto. The invention may be applied to an adjuster including, for instance, a slidable lever.

In the above-described first embodiment, the change in the illumination colors of the LED illuminators 67 allows the operator to visually check a degree of amplification, but the invention is not limited thereto. For instance, the LED illuminators may illuminate in the same color, with flashing intervals thereof being shortened as amplification rates increase.

In the above-described fifth exemplary embodiment, the DJ mixer 1A is connected to the computer 10 via lines compliant with the MIDI standard, but the invention is not limited thereto. Lines compliant with other standards may be used for connection.

Additionally, a specific structure, shape or the like in implementing the invention may be altered to another structure or the like as long as the object of the invention can be achieved.

The invention claimed is:

1. A sound volume operation device configured to amplify and output an inputted acoustic signal, the device comprising:
a plurality of sound volume adjusters each configured to adjustably amplify an input sound volume level in a different frequency band of the inputted acoustic signal, the plurality of sound volume adjusters being arranged separately from each other;
an output level detector configured to detect an output sound volume level of the acoustic signal amplified by each of the plurality of sound volume adjusters; and
an illuminator provided at or adjacent to each of the plurality of sound volume adjusters and configured to provide a different illumination color according to the output sound volume level detected by the output level detector for each of the plurality of sound volume adjusters.

2. The sound volume operation device according to claim 1, wherein
the illuminator normally illuminates in an illumination color with a different hue, and the illumination color of the illuminator is changed to an illumination color in an achromatic color when the output level detector detects that the output sound volume level is smaller than a predetermined reference sound volume level.

3. The sound volume operation device according to claim 1, wherein
the sound volume operation device is a graphic equalizer.

4. A sound volume operation device configured to amplify and output an inputted acoustic signal, the device comprising:
at least one sound volume adjuster configured to adjustably amplify an input sound volume level of the inputted acoustic signal;
an output level detector configured to detect an output sound volume level of the acoustic signal amplified by the at least one sound volume adjuster;
an illuminator provided at or adjacent to the at least one sound volume adjuster and configured to provide a different illumination state according to the output sound volume level detected by the output level detector;
an operating unit body; and
a computer connected to the operating unit body via a line according to the MIDI (Musical Instrument Digital Interface) standard, wherein
the computer comprises:
the output level detector; and
a MIDI transmitter configured to transmit the output sound volume level detected by the output level detector via the line according to the MIDI standard, and
the operating unit body comprises:
the illuminator;
a MIDI receiver configured to receive the output sound volume level transmitted from the MIDI transmitter via the line according to the MIDI standard; and
an illumination controller configured to control the illumination state of the illuminator according to the output sound volume level received by the MIDI receiver.

* * * * *